US008876316B2

(12) United States Patent
Lu et al.

(10) Patent No.: US 8,876,316 B2
(45) Date of Patent: Nov. 4, 2014

(54) BACKLIGHT MODULE

(71) Applicant: Unity Opto Technology Co., Ltd., New Taipei (TW)

(72) Inventors: Ko-Wei Lu, New Taipei (TW); Ping-Chen Wu, New Taipei (TW); Wei-Chung Lin, New Taipei (TW); Yi-Yu Tsai, New Taipei (TW)

(73) Assignee: Unity Opto Technology Co., Ltd., New Taipei (TW)

( * ) Notice: Subject to any disclaimer, the term of this patent is extended or adjusted under 35 U.S.C. 154(b) by 176 days.

(21) Appl. No.: 13/688,490

(22) Filed: Nov. 29, 2012

(65) Prior Publication Data

US 2014/0111970 A1     Apr. 24, 2014

(30) Foreign Application Priority Data

Oct. 19, 2012   (TW) .............................. 101138639 A (51) Int. Cl.
*G09F 13/04*    (2006.01)

(52) U.S. Cl.
CPC ..................................... *G09F 13/04* (2013.01)
USPC ........................................ 362/97.1; 362/97.3

(58) Field of Classification Search
USPC ............... 362/97.1, 97.3, 606, 543, 544, 545, 362/246, 249.02
See application file for complete search history.

(56) References Cited

U.S. PATENT DOCUMENTS

| 8,714,771 | B2 * | 5/2014 | Nishimori et al. ....... 362/217.12 |
| 2012/0057353 | A1 * | 3/2012 | Wei .......................... 362/311.09 |
| 2012/0140448 | A1 * | 6/2012 | Nagayoshi et al. .......... 362/97.3 |

* cited by examiner

*Primary Examiner* — Vip Patel
(74) *Attorney, Agent, or Firm* — Rosenberg, Klein & Lee (57) ABSTRACT

A backlight module is provided, including a back plate, a diffusion plate, multiple lighting bars mounted on the back plate and at least one lighting module mounted on each of the lighting bars, where each of the lighting modules has an LED forward light source and at least one pair of LED non-forward light sources, and the pair of LED non-forward light sources is mounted on the side of the LED forward light source, and light emitted from the LED forward light source and light emitted from each of the pair of LED light sources are spliced together to form a diffusing light shape. Therefore, the backlight module of the present invention has reduced lighting bars to decrease the weight, volume and cost of the whole backlight module and liquid-crystal display device, and overcome the problems of non-uniform brightness of conventional backlight modules.

20 Claims, 7 Drawing Sheets

BACKLIGHT MODULE

CROSS-REFERENCE TO RELATED APPLICATIONS

This non-provisional application claims priority under 35 U.S.C. §119(a) on Patent Application No(s). 101138639 filed in Taiwan, R.O.C. on Oct. 19, 2012, the entire contents of which are hereby incorporated by reference.

BACKGROUND OF THE INVENTION

1. Field of the Invention

The present invention relates to backlight modules. A backlight module is proposed with a reduced number of lighting bars and LEDs. This solves the problem of non-uniform brightness seen in conventional backlight modules thanks to a uniform backlight source.

2. Description of Related Technology

A liquid-crystal display device is a passive display device without auto-lighting function and which has to install a light source to provide the required display light source for the display panels. Therefore, the display quality of liquid crystal display devices are is dependent upon the backlight modules providing a light source with sufficient brightness to give the display panel a uniform brightness.

Generally, a backlight module can be divided to front light type and back light type, and in fact can be further divided into sidelight type structure, hollow type structure and direct type structure. Therefore, a small-sized backlight module with sidelight type structure can saved manpower and materials, but a large-sized backlight module with sidelight type structure has the drawback of providing non-uniform lighting and being difficult to manufacture. A backlight module with the direct type structure, where there is no need to set the light guide plate, was created as a result. The direct type structure is used in the large-sized backlight module, and the backlight module with the direct type structure can take light from the source, reflect it with the reflecting plate, and scatter it uniformly with the diffusion plate where it can come out the front side. Therefore, the light source can be installed with two or more light tubes according to the size of the panel and thus the uniformity of the light irradiation can be increased. However, the slender light tubes are costly to produce and easy to break. And the installation of reflective plates is another technical question that still awaits a satisfying answer.

As such, a technology recently appeared on market that uses light-emitting diodes used on a backlight module. Due to the light-emitting diodes' small size, low power consumption, long life, short reaction time and strong shock-resistance, they are widely used as a lighting or backlighting light source, as a replacement for traditional light sources like incandescent light bulbs, cold cathode tubes or fluorescent tubes.

Generally, when the light-emitting diodes are installed on a backlight module, they are connected by conductive circuits in series connection or parallel connection and mounted on circuit board which is referred to as a "light bar".

Figure 1:
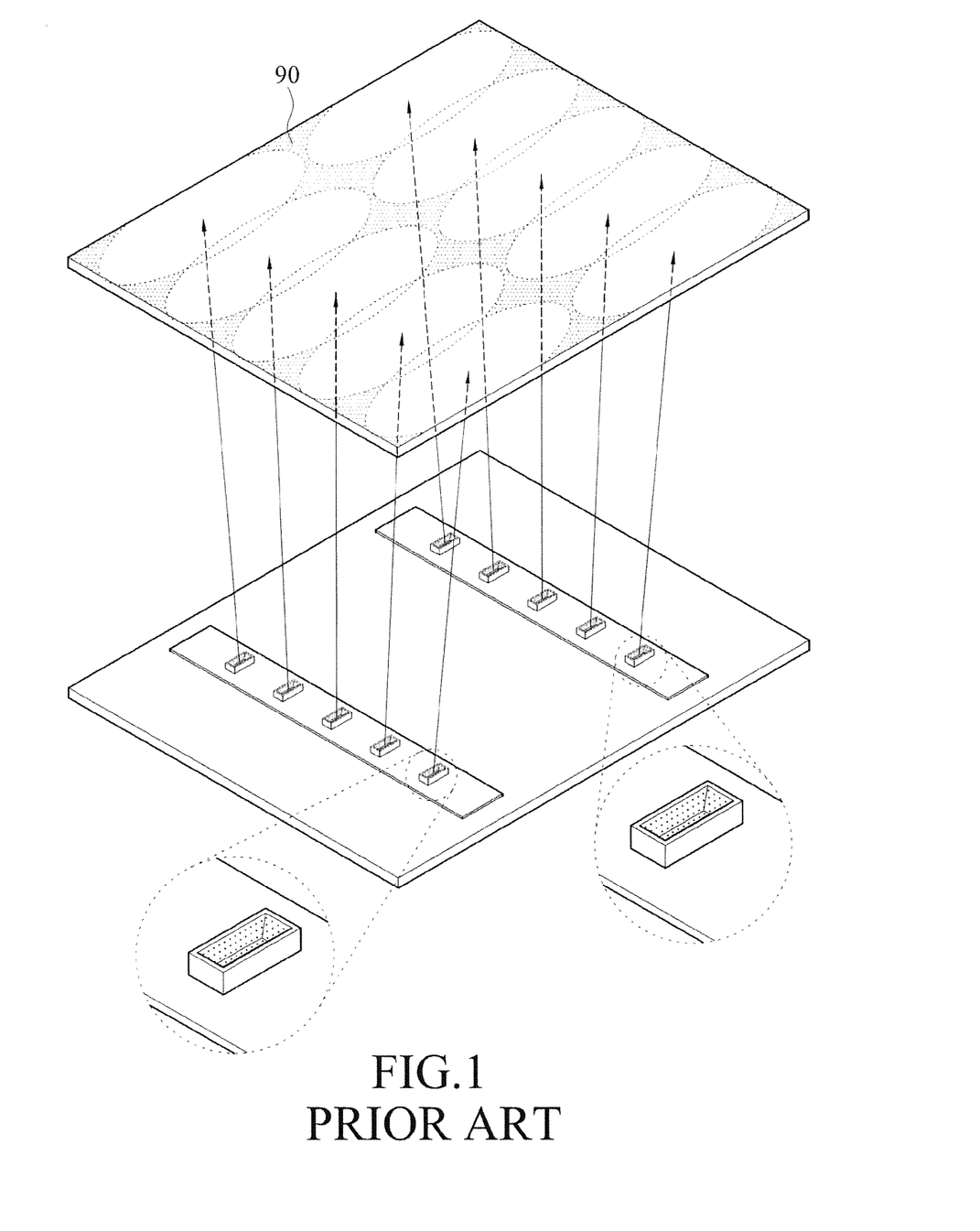
FIG. 1 is a perspective view of a back light module in accordance with the prior technology.

In order to make the light source irradiate uniformly to the plate and improve problems like insufficient light or irradiation non-uniform, the conventional LCD display devices usually have several light bars mounted on the back plate and/or several light emitting diodes mounted in each light bar, which in turn increases the overall cost of the LCD display. Additionally, as shown in FIG. 1, due to the fact that LEDs are a directional light source, the direction and angle of the light source are limited. Thus, it is likely that the dark area 90 of the display panel will appear, due to bad locations or insufficient number of LEDs of the backlight modules. In order to solve these problems, however, merely adding LEDs on the light bars or adjusting the locations of the light bars on the back plate would have the result that the LEDs could not be used to their full potential and their lighting efficiency would suffer. Furthermore, the weight, volume and cost of the overall backlight module and liquid crystal display device would increase.

Therefore, as far as market demand is concerned, there is an urgent need for the design of a backlight module that provides a uniform backlight light source while reducing the amount of LEDs used so as to lower overhead costs.

SUMMARY OF THE INVENTION

In view of the foregoing problems of the prior technology, the objective of the present invention is to provide a backlight module able to enhance the brightness of dark area of the diffusion plate, in order to let the light emitted from LED light source transfer to the display panel and then display a uniform backlight source, which would solve the current problem. According to the outline of the present invention, a backlight module is provided and used for joining to a display panel with a back plate and a diffusion plate. The backlight module has a back plate and a diffusion plate, characterized as follows:

A plurality of lighting bars are mounted on the back plate, and each of the lighting bars has at least one lighting module mounted on it, with at least one lighting module on each having an LED forward light source and at least one pair of LED non-forward light source, the at least one pair of LED non-forward light source is mounted on the side of the LED forward light source. The light emitted from the LED forward light source and the light emitted from the at least one pair of LED non-forward light source are combined to form a diffusion light shape on the diffusion plate, and the diffusion light shape on the diffusion plate spices mutually.

According to the objective of the present invention, in one aspect, the LED forward light source has a first emitting surface mounted parallel to the back plate; at least one pair of LED non-forward light sources has second emitting surfaces, and each of the second emitting surfaces are mounted non-parallel to the back plate at an angle θ, where $90° \leq \theta < 180°$. The LED forward light source and the at least one pair of LED non-forward light sources are packaged integrally through an optical lens, the lights emitted from the LED forward light source and the at least one pair of LED non-forward light source forming a diffusion light shape via second optical refraction.

According to the objective of the present invention, in another aspect, the light emitted from the LED forward light source is combined with the light emitted from the at least one pair of LED non-forward light source after refracted via an optical lens, in order to form the diffusion light shape. Furthermore, the diffusion light shape is that of a circle, oval or square.

In a preferred embodiment, the number of the lighting bars is 2 to 3, when the size of the display panel is 32 inches or 39 inches; the number of the lighting bars is 3 to 4, when the size of the display panel 42 inches or 46 inches; the number of the lighting bars is 4 to 5, when the size of the display panel 50 inches or 55 inches.

As described above, the LED forward light source and the at least one pair of non-forward light sources can be packaged integrally via an optical lens, and the emitting light can be formed into two kinds of light shapes to overcome the problem of non-uniform brightness; otherwise, the at least one pair of non-forward light sources can be refracted via an optical lens to form a second light shape on the diffusion plate that can enhance the light intensity of the first light shape. Various light shapes can be designed and the direction of the light source can be changed by an optical lens in order to solve the problem of non-uniform brightness of conventional backlight modules. Thus, the backlight module of the present invention can have less lighting bars due to the at least one pair of LED non-forward light sources, which will decrease weight, volume and cost of the whole backlight module and liquid-crystal display device.

DETAILED DESCRIPTION OF THE PREFERRED EMBODIMENTS

The technical contents of the present invention will become apparent with the detailed description of preferred embodiments and the illustration of related drawings as follows.

In accordance with the present invention, the backlight module can be used for joining with a display panel to provide required display light source of the display panel and reveal a uniform backlight source.

Figure 2A:
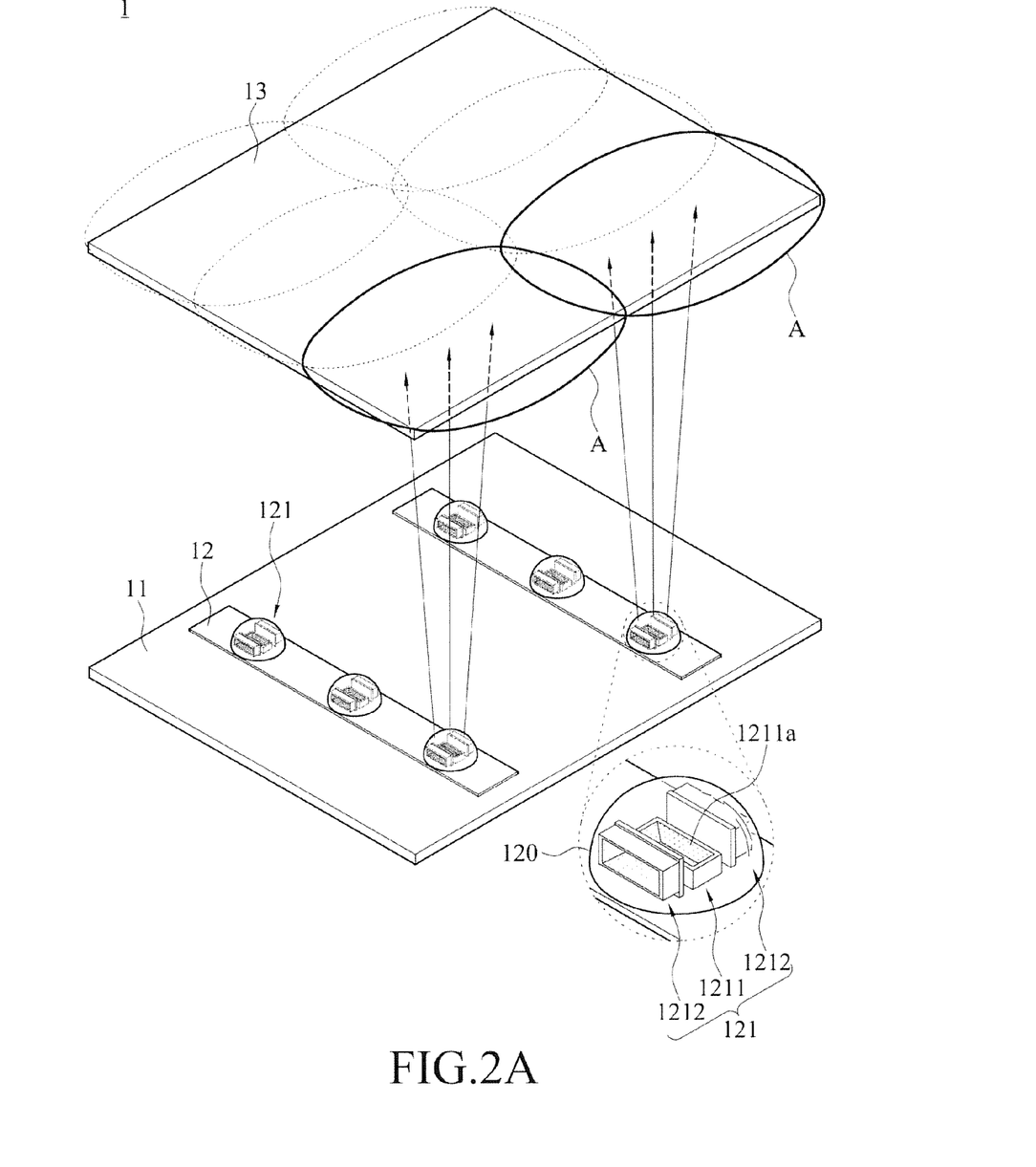
FIG. 2A is a perspective view of a first embodiment of a back light module in accordance with the present invention.
Figure 2B:
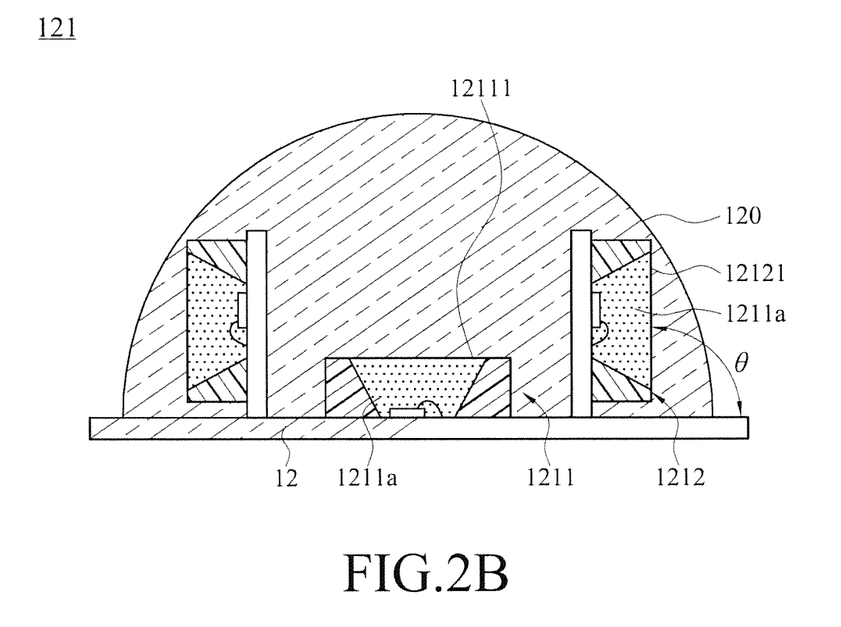
FIG. 2B is a side view in partial section of the back light module in FIG. 2A.

FIG. 2A and FIG. 2B are respectively a schematic view of a first embodiment of a backlight module of the present invention and a section view of a first embodiment of a lighting module of the present invention. As shown in FIG. 2A, the backlight module 1 has a back plate 11, a diffusion plate 13 and multiple lighting bars 12. The lighting bars 12 are mounted on the back plate 11 for joining with a display panel. The number of the lighting bars is preferably 2 to 3 when the size of the display panel is 32 inches or 39 inches. In order to understand the characteristics of the present invention, in this embodiment there are 2 lighting bars mounted on the back plate 11; however, the number of the lighting bars is not limited. Each of the lighting bars has multiple lighting modules 121 arranged in an array, where each lighting modules 121 has an LED forward light source 1211 and at least one pair of LED non-forward light sources 1212, and the at least one pair of LED non-forward light sources 1212 is mounted on the side of the forward light source 1211. In this embodiment, each of the lighting modules 121 has an LED forward light source 1211 and one pair of LED non-forward light source 1212 that arranged in array as shown in FIG. 2A. In one aspect, the light emitting from the LED forward light source 1211 packaged by an encapsulation gel 1211a is refracted via secondary optical refraction and combined with the light emitting from the non-forward light source and is formed in the diffusion light shape A on the diffusion plate 13.

When the light emitting from the LED forward light source 1211 is formed into the diffusion light shape A, each of the diffusion light shapes A are spliced and adjusted according to optical design to form a uniform light source. In the first embodiment, for easily understanding the technical characteristics of the present invention, the diffusion light shape A is oval, a variety of LED forward light source 1211 and LED non-forward light source 1212 can be chosen to show a circle light shape, an oval light shape or a square light shape as practically used.

Otherwise, as shown in FIG. 2B, it is noteworthy that the lighting modules 121 of the present invention, the LED forward light source 1211 has a first emitting surface 12111 and the first emitting surface 12111 is mounted parallel to the back plate 11. The at least one pair of LED non-forward light source 1212 has a second emitting surface 12121 and the second emitting surface 12121 is mounted non-parallel to the back plate and having an angle θ where, in this embodiment, θ=90°.

Figure 3A:
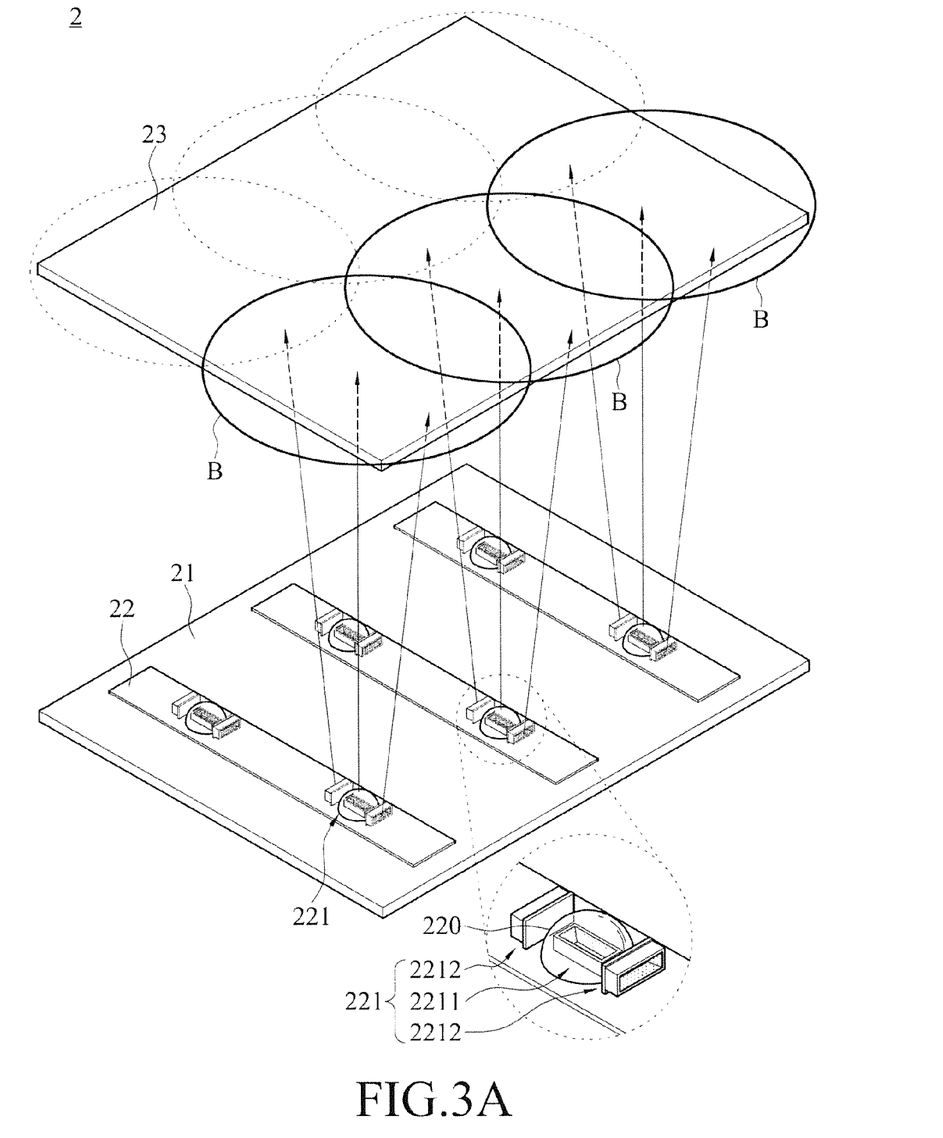
FIG. 3A is a perspective view of a second embodiment of a back light module in accordance with the present invention.
Figure 3B:
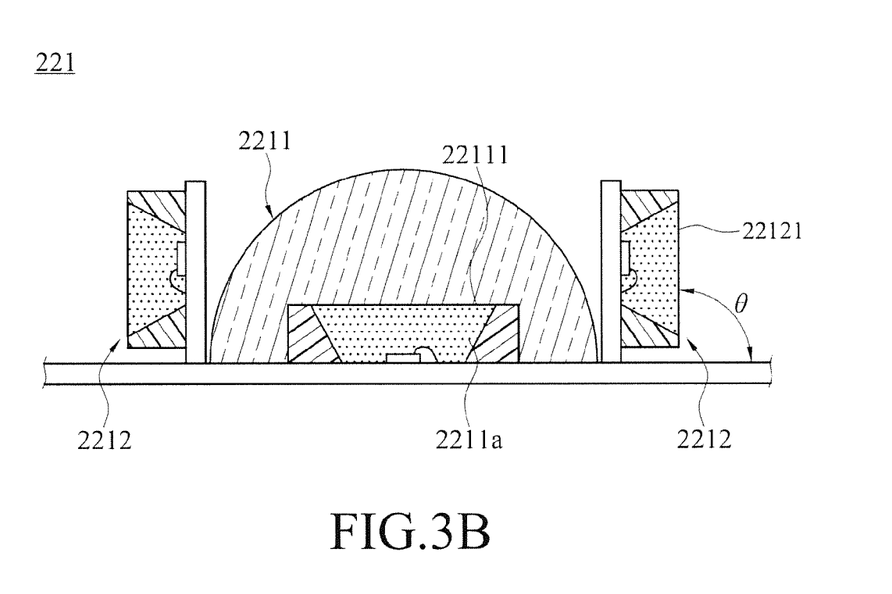
FIG. 3B is a side view in partial section of the back light module in FIG. 3A.

FIG. 3A and FIG. 3B are, respectively, a schematic view and a section view of a second embodiment of a backlight module of the present invention. In this embodiment, the backlight module 2 has 3 lighting bars 22 mounted on the back plate 21; however, the number of the lighting bars is preferably 3 to 4, when the size of the display panel is 42 inches or 46 inches.

As shown in FIG. 3A and FIG. 3B, the backlight module 2 comprises a back plate 21, a diffusion plate 23, and three lighting bars 22 mounted on the back plate 21, and the distances between the lighting bars 22 can be adjusted according to the distance between the back plate 21 and the diffusion plate 23, and each of the lighting bars 22 has multiple lighting modules 21 arranged in an array.

In one aspect, in this embodiment, the back plate 21 has an LED forward light source 2211 and one pair of LED non-forward light source 2212. It is noteworthy that the LED forward light source 2211 has a first emitting surface 22111 and the first emitting surface 22111 is mounted parallel to the back plate 21, and the pair of LED non-forward light source 2212 has a second emitting surface 22121 and the second emitting surface 22121 is mounted non-parallel at a angle θ, where 90°≤θ<180°. Accordingly, the angle, θ, can be adjusted to various degrees corresponding to various sizes of the display panels to achieve best uniform lighting effect.

Furthermore, in the lightening module 22, the LED forward light source 2211 is packaged by an optical lens 220, and the light emitting therefrom refracted via primary optical refraction is combined with the light emitting from the LED non-forward light source 2212 to form the diffusion light shape B on the diffusion plate 23. The shape of the diffusion light shape B can be limited according to the LEDs mounted by users, such as circle, oval or square light shape. It is also practicable in the present invention if it is desirable to cover lens on the LED non-forward light source 2212 for adjusting the light shape and location of lightening.

Therefore, in order to mitigate the side-effects of non-uniform brightness on the diffusion plate of conventional backlight modules, the backlight module 2 of the present invention can enhance the light intensity of the dark area of the diffusion plate 23. Furthermore, the backlight module 2 can adjust the locations of the lighting bars 22 and the tilt angle of the second emitting surface 22121 according to the distance between the back plate 21 and the diffusion plate 33, to regulate the light source of the backlight module 2 can transfer to the display panel.

Also, the pattern of the lighting module in the center of the back plate 21 can be replaced according to the size of the desired display panels.

Figure 4A:
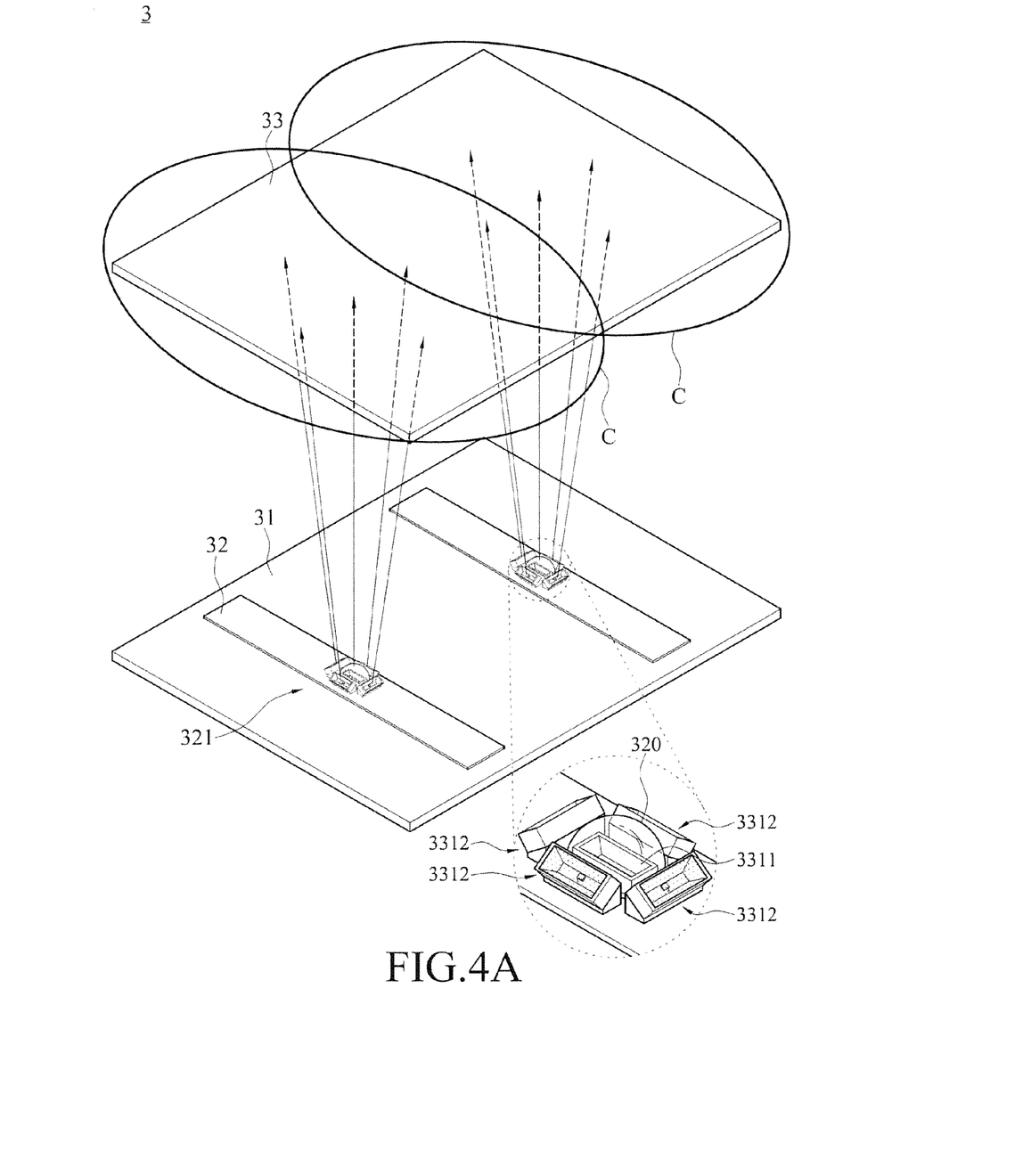
FIG. 4A is a perspective view of a third embodiment of a back light module in accordance with the present invention.
Figure 4B:
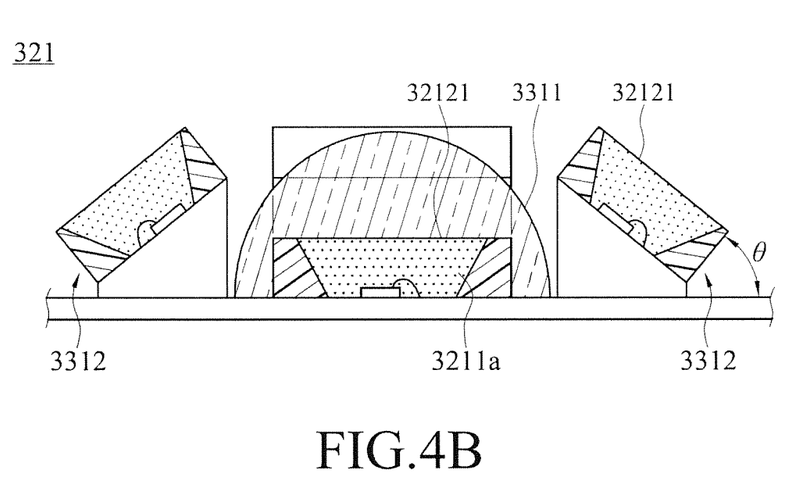
FIG. 4B is a side view in partial section of the back light module in FIG. 4A.

With reference to FIGS. 4A and 4B, they are a schematic view and a section view of a third embodiment of a backlight module of the present invention. The backlight module 3 comprises a back plate 31, a diffusion plate 33 and multiple lighting bars 32. In this embodiment, there are two lighting bars 32 for the sake of example, but more are possible. Also, the location of the lighting bars 32 on the back plate 31 can be adjusted according to the distance between the diffusion plate 33 and the back plate 31.

In one aspect, the lighting bars 32 are mounted on the back plate 31, and the lighting modules 321 are mounted on the lighting bars 32. The lighting module 321 has an LED forward light source 3311 and two pair LED non-forward light sources 3312, and the LED non-forward light sources 3312 are mounted on two sides of the LED forward light source 3311, and the LED forward light source 3311 is arranged adjacently. As shown in figures, the LED non-forward light sources 3312 are packaged by an encapsulation gel 3211a and an optical lens 320, and the lights emitting from the LED forward light source 3311 and the LED non-forward light source 3312 are combined together.

Therefore, in the lightning module 321, the light emitting from the LED forward light source 3311 is combined with the LED non-forward light source 3312, forming the diffusion light shape C on the diffusion plate 33.

As shown in FIG. 4B, in the lighting module 321, the second emitting surface 32121 of the LED non-forward light source 3312 has an angle θ, and 90°≤θ<180°. Accordingly, the degree, θ can be adjusted to various degrees corresponding to various sizes of the display panels to achieve best uniform lighting effect.

In the first embodiment, the second embodiment and the third embodiment, a variety of LEDs can be mounted to be used as the LED forward light source and the LED non-forward light source, in order to make the first light shape and the second light shape emitting from the LED forward light source and the LED non-forward light source a circle, oval or square.

In preferred application, the number of the lighting bars is 2 to 3, when the size of the display panel is 32 inches or 39 inches; the number of the lighting bars is 3 to 4, when the size of the display panel is 42 inches or 46 inches; the number of the lighting bars is 4 to 5, when the size of the display panel is 50 inches or 55 inches.

As described above, the backlight module of the present invention has following advantages:
(1) The backlight module of the present invention has at least one pair LED non-forward light sources, and less lighting bars and LEDs can be mounted according to different arrangement modes to reduce the weight, volume and cost of the whole backlight module and liquid crystal display device.
(2) A LED forward light source and at least one pair of LED non-forward light sources mounted in the backlight module of the present invention are packaged as a whole; alternatively, they are separately packaged on the LED forward light source by an optical lens, causing the light emitting from the LED forward light source and the LED non-forward light source to be combined together to form a diffusion light shape on the diffusion plate, thus solving the problem of non-uniform brightness of conventional backlight modules.
(3) The direction of light source of the backlight module of the present invention can be changed via optical lens to overcome the problem of non-uniform brightness of conventional backlight modules.

What is being claimed:

1. A backlight module used for joining with a display panel and having a back plate and a diffusion plate, characterized in that:
a plurality of lighting bars are mounted on the back plate, and each of the lighting bars has at least one lighting module mounted thereon, where each of the at least one lighting module has an LED forward light source and at least one pair of LED non-forward light sources, the at least one pair of LED non-forward light sources is mounted on the side of the LED forward light source, and further the light emitted from the LED forward light source and the light emitted from the at least one pair of LED non-forward light sources are combined to form a diffusion light shape on the diffusion plate, and the diffusion light shape on the diffusion plate splicing mutually.

2. The backlight module as claimed in claim 1, characterized in that the number of the lighting bars is 2 to 3, when the size of the display panel is 32 inches or 39 inches.

3. The backlight module as claimed in claim 1, characterized in that the number of the lighting bars is 3 to 4, when the size of the display panel is 42 inches or 46 inches.

4. The backlight module as claimed in claim 1, characterized in that the number of the lighting bars is 4 to 5, when the size of the display panel is 50 inches or 55 inches.

5. The backlight module as claimed in claim 1, characterized in that the LED forward light source has a first emitting surface parallel mounted relative to the back plate; the pair of LED non-forward light source has second emitting surfaces respectively, and each of the second emitting surface non-parallel mounted relative to the back plate and having a degree θ, where 90°≤θ<180°.

6. The backlight module as claimed in claim 5, characterized in that the number of the lighting bars is 2 to 3, when the size of the display panel is 32 inches or 39 inches.

7. The backlight module as claimed in claim 5, characterized in that the number of the lighting bars is 3 to 4, when the size of the display panel is 42 inches or 46 inches.

8. The backlight module as claimed in claim 5, characterized in that the number of the lighting bars is 4 to 5, when the size of the display panel is 50 inches or 55 inches.

9. The backlight module as claimed in claim 5, characterized in that the LED forward light source and the pair of LED non-forward light source are packaged integrally through an optical lens, the lights emitted from the LED forward light source and the pair of LED non-forward light source are formed into the diffusion light shape via second optical refraction.

10. The backlight module as claimed in claim 9, characterized in that the number of the lighting bars is 2 to 3, when the size of the display panel is 32 inches or 39 inches.

11. The backlight module as claimed in claim 9, characterized in that the number of the lighting bars is 3 to 4, when the size of the display panel is 42 inches or 46 inches.

12. The backlight module as claimed in claim 9, characterized in that the number of the lighting bars is 4 to 5, when the size of the display panel is 50 inches or 55 inches.

13. The backlight module as claimed in claim 1, characterized in that the light emitted from the LED forward light source is combined with the light emitted from the pair of LED non-forward light sources after having been refracted via an optical lens, in order to form the diffusion light shape.

14. The backlight module as claimed in claim 13, characterized in that the number of the lighting bars is 2 to 3, when the size of the display panel is 32 inches or 39 inches.

15. The backlight module as claimed in claim 13, characterized in that the number of the lighting bars is 3 to 4, when the size of the display panel is 42 inches or 46 inches.

16. The backlight module as claimed in claim 13, characterized in that the number of the lighting bars is 4 to 5, when the size of the display panel is 50 inches or 55 inches.

17. The backlight module as claimed in claim 1, characterized in that the diffusion light shape is a circle light shape, an oval light shape or a square light shape.

18. The backlight module as claimed in any of claims 17, characterized in that the number of the lighting bars is 2 to 3, when the size of the display panel is 32 inches or 39 inches.

19. The backlight module as claimed in claim 17, characterized in that the number of the lighting bars is 3 to 4, when the size of the display panel is 42 inches or 46 inches.

20. The backlight module as claimed in claim 17, characterized in that the number of the lighting bars is 4 to 5, when the size of the display panel is 50 inches or 55 inches.

\* \* \* \* \*